Dec. 25, 1945.  E. T. MEAKIN  2,391,638
APPARATUS FOR MAKING PELLETS
Filed June 8, 1942  4 Sheets-Sheet 1

INVENTOR.
EDGAR T. MEAKIN
BY Charles O Bruce
HIS ATTORNEY.

Dec. 25, 1945.  E. T. MEAKIN  2,391,638
APPARATUS FOR MAKING PELLETS
Filed June 8, 1942  4 Sheets-Sheet 4
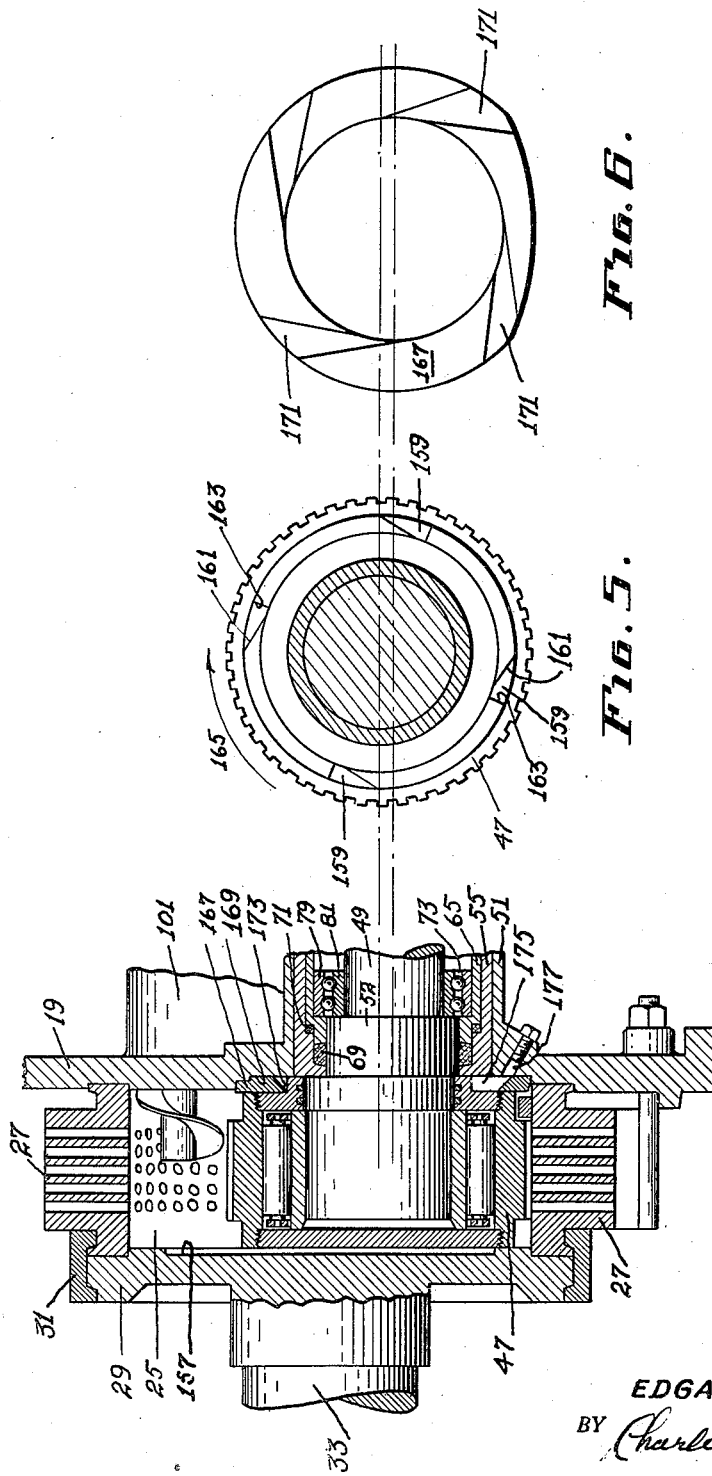
INVENTOR.
EDGAR T. MEAKIN
BY Charles O Bruce
HIS ATTORNEY.

Patented Dec. 25, 1945

2,391,638

UNITED STATES PATENT OFFICE 2,391,638

APPARATUS FOR MAKING PELLETS

Edgar T. Meakin, San Francisco, Calif.

Application June 8, 1942, Serial No. 446,309

14 Claims. (Cl. 18—12)

My invention relates to pelleting apparatus, and more particularly to apparatus for pelleting material which is dangerous to handle in the presence of oxygen.

Many chemicals and chemical compounds in the presence of oxygen are either subject to spontaneous combustion or are readily detonated. Among such, may be included sodium, magnesium, gun powder, etc. Consequently, the preparation of such elements and compounds is a hazardous procedure which is somewhat complicated when it is desired to prepare the same in pellet form. Present methods of preparing and handling materials of this nature, do not lend themselves to quantity production at a rapid rate in pellet form.

Among the objects of my invention are:

(1) To provide novel and improved apparatus of the type described, adapted primarily for the pelleting of material which is otherwise dangerous to handle in the presence of oxygen;

(2) To provide novel and improved apparatus of the type described, capable of pelleting such material in large quantities at a rapid rate;

(3) To provide novel and improved apparatus of the type described, capable of pelleting material out of contact with the atmosphere; and (4) To provide novel and improved apparatus of the type described, for the pelleting of material including an ingredient of a tacky nature such as molasses or the like.

Additional objects of my invention will be brought out in the following description of the same taken in conjunction with the accompanying drawings wherein—

Figure 4 is a view in section, showing a modified die chamber for the handling of ingredients of a tacky nature;

Figures 5 and 6 are views illustrating elements of the modified die chamber of Figure 4.

Figure 1:
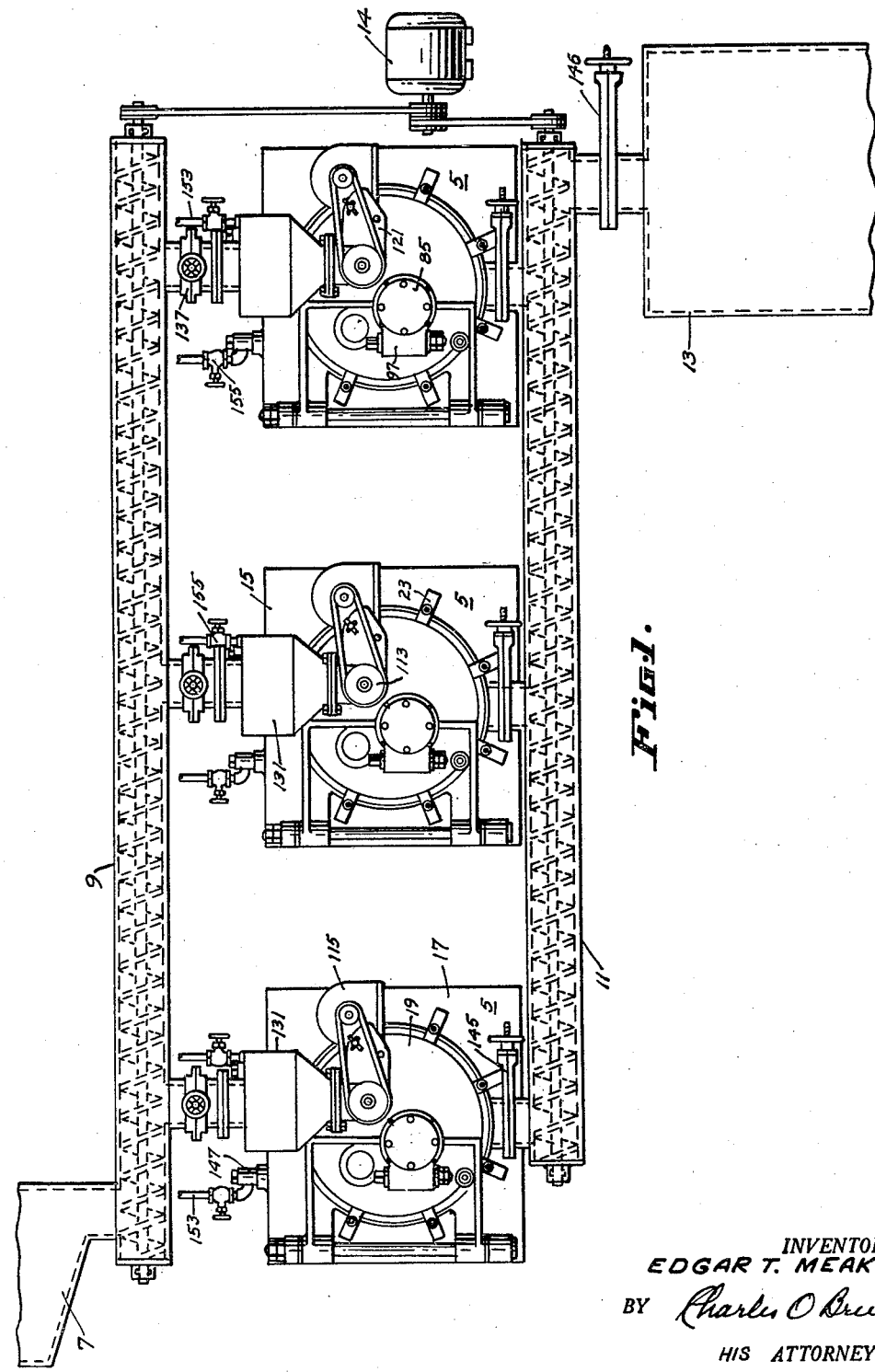
Figure 1 is a view depicting the general arrangement of apparatus involved in the present invention.
Figure 2:
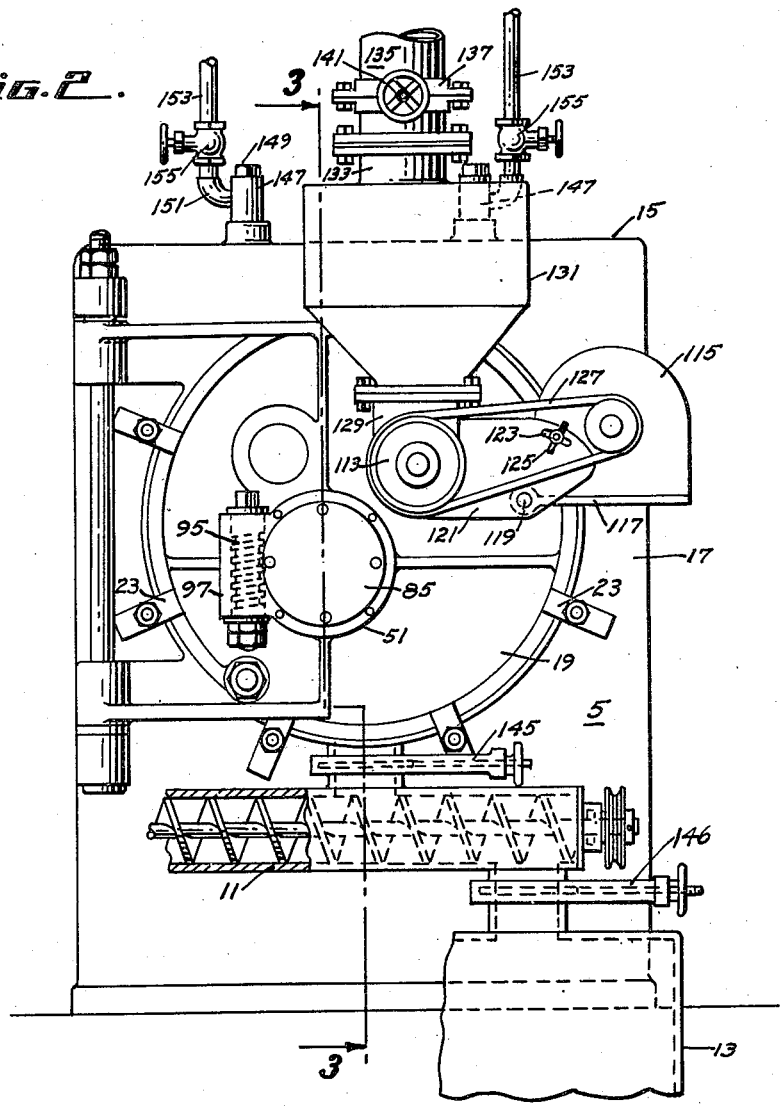
Figure 2 is a front elevational view, partly fragmentary, of a mill forming one of a plurality of such mills in the apparatus of Figure 1.
Figure 3:
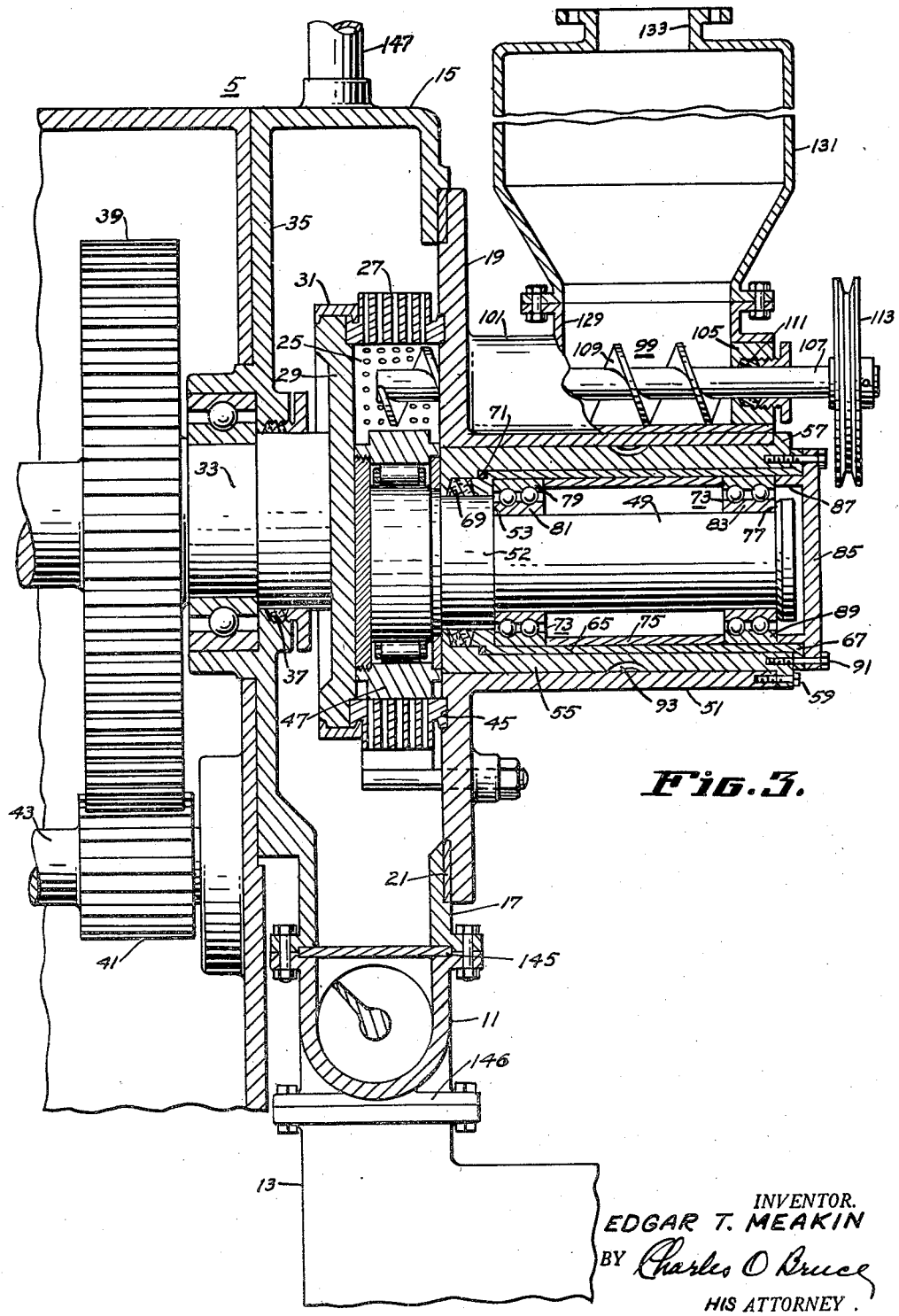
Figure 3 is a view in section, taken along the line 3—3 of Figure 2, and with a portion of the hopper feed mechanism broken away to expose the same.

The arrangement of apparatus illustrated in Figure 1. includes a plurality of pellet mills 5 of special design, assembled in gang formation. In such assembly, the mills are preferably fed simultaneously from a common source of supply 7, through a feed conveyor 9 which, in the present instance, is preferably of the screw type. The output of each mill is discharged into a similar conveyor 11 which is common to all the mills, and it discharges the combined output into a receiving receptacle 13. The supply source, as represented, may constitute merely a tank or receptacle for holding material to be pelleted, and is preferably of air-tight construction. In the case of certain materials, the initial steps of preparing the material out of the presence of oxygen, or out of contact with air, may all be carried out in this part of the system, designated broadly as the supply source. The various other apparatus components, namely the feed conveyor 9, the discharge conveyor 11, and the receiving receptacle 13, are all of air-tight construction, as well as the mills themselves, as will be subsequently brought out, thus creating a closed or sealed system, whereby the complete process of preparing and pelleting material of the character described may be carried out.

The conveyors 9 and 11 may be driven from a common motor 14 at any desired speed relative to each other to assure that the discharge conveyor shall handle the full output of all mills.

Each of the mills comprises a housing 15, the front wall 17 of which has a large circular opening, to be closed by a circular door 19 hinged to the front wall, the door in its closed position thus forming, in effect, a part of the front wall of the housing. The door is preferably recessed about its edge to receive a sealing gasket 21 which is compressed to effect an air-tight seal between the door and the front wall, by a plurality of clamps 23 distributed on the front wall around the door, and adapted to exert pressure against the periphery of the door in its closed position.

The extrusion chamber 25 is located within the housing and includes a cylindrical die 27, one end of which is closed by a die supporting plate 29 forming the back wall of the extrusion chamber. The die is supported on its backing plate by a split ring clamp 31 fitting over the edge of the backing plate and engaging a peripheral groove in the die, the two halves of the clamping ring being bolted together at the extremities of the horizontal diameter of the backing plate 29.

The backing plate is affixed to one end of a shaft 33 which extends through the rear wall 35 of the housing and sealed therein by a suitable packing gland 37. Any suitable means may be employed for rotating the shaft 33 to effect rotation of the die 27, and as an example of such means, I have illustrated a large ring gear 39 mounted on the shaft and engaging a small pinion gear 41 on a drive shaft 43 which in turn may be driven from any suitable motor or other prime mover (not shown).

To provide added support to the die and stabilize its operation, the door 19 is provided with a circular groove 45 on its inner surface, to receive the free edge of the die when the door is urged to its closed position. The circular groove thus provides a bearing surface for the die during rotation thereof.

Within the extrusion chamber, there is an extrusion element, preferably in the form of an extrusion roller 47. This is maintained in proper cooperating relationship with the compression surface of the die by mounting the same at one end of a suitable shaft 49 which is supported within a boss 51 extending from the door and formed integrally therewith. A portion 52 of the shaft adjacent the roller is of increased diameter to provide a shoulder 53.

As a means of supporting the shaft within the boss, I provide a sleeve 55 snugly fitting within the boss and formed with a flange 57 at its outer end. The flange permits of attachment to the front edge of the boss 51 by suitable bolts 59. The internal end of the sleeve 55 is so formed as to provide a pair of interior shoulders in proximity to the portion of the roller shaft of increased diameter.

A second sleeve 65 is snugly fitted within the first mentioned sleeve 55. This second sleeve is flanged at its outer end, to provide a flange 67 adjacent the front surface of the first sleeve, and at its inner end, this second sleeve is formed to fit about the enlarged portion of the roller shaft, and cooperate with the internal end of the first sleeve to provide annular spaces for the reception of sealing gaskets 69 and 71.

The roller shaft 49 is journalled in a pair of bearing assemblies 73 of the ball bearing kind, fitting within the sleeve 65 and spaced apart by a spacer sleeve 75. The end of the shaft is capped to provide a shoulder 77, the length of the spacer sleeve being such as to cause the outer race 79 of the inner bearing assembly to engage the inner end of the second sleeve 65, and the inner race 81 to bear against the shoulder 53 of the roller shaft, while with the outer bearing assembly, the inner race 83 is in contact with the shoulder 77 at the end of the shaft.

The outer end of the flanged sleeve 65 is closed by a cap 85 having a depending skirt 87 fitting within the end of the sleeve, to engage the outer race 89 of the outer bearing assembly. The cap 85 is maintained in place by a series of bolts 91 extending through the cap periphery and the flange of the second sleeve 65 and threadedly engaging the first sleeve 55. The bearing assemblies 73, by reason of the construction described, are thus caused to function, not only as antifriction bearings for the roller shaft, but also as thrust bearings to maintain proper position of the roller 47 in the extrusion chamber 25.

In the preferred embodiment of my invention, the sleeve 55 is preferably of an eccentric construction whereby adjustment of the roller 47 to compensate for wear may be realized through a rotational shift of this sleeve through a sufficient angle. When an eccentric sleeve is employed, the bolt openings through the flange 57 will then preferably be arcuate in shape to facilitate the making of such adjustments. The actual angular rotation of the sleeve is realized by forming a series of teeth 93 in the outer surface of the eccentric sleeve, to be engaged by an adjusting worm 95 supported in an offset 97 formed integral with the boss.

Material to be pelleted is fed into the extrusion chamber 25, through an opening in the door, from preferably, a screw type conveyor 99. This conveyor includes a generally cylindrical casing 101 having an open end in alignment with the feed opening through the door, this casing being preferably welded to the door around this opening to form a gas-tight connection therewith. The opposite end of the casing is closed by a plug or closure 105 having an opening to receive the shaft end 107 of the screw 109 which is enclosed within the casing. The screw might terminate at the opening in the door, though it is preferably of a length to extend within the extrusion chamber to a point above the roller 47. The shaft end of the screw is sealed in the closure end of the casing by a suitable packing gland 111, and a pulley or sprocket 113 is affixed to the end of the shaft to effect driving connection to the screw from some suitable prime mover. In the present instance, this prime mover is a motor 115 carried on a platform 117, which is secured to a pivot shaft 119 having one end anchored to the door and the other end supported in a plate 121 extending laterally from the casing 101. This laterally extending plate may be provided with an arcuate slot 123 having the pivot shaft 119 at its center of curvature, such slot to receive a threaded bolt extending from the motor casing, whereby, through the use of a wing nut 125 or other suitable clamping means on the bolt, the position of the motor may be adjusted to obtain proper tension on the drive belt 127 or chain, as the case may be, through which the screw 109 is driven.

The casing 101 is formed with an inlet passage 129 which is flanged for bolting to the flanged discharge end of a hopper 131. A gasket, if necessary, between the flanges will assure the connection being sealed to the atmosphere.

The hopper at its intake end is provided with a short flanged neck 133 to which is connected a pipe 135 leading from the common screw feed conveyor 9. This pipe includes a gate assembly 137 at a point adjacent the flanged neck of the hopper. In constructing the gate assembly, the pipe 135 may be formed in two sections, the joining end of each terminating in a complementary portion of the gate housing. A handwheel 141 is rotatably mounted at one end of the housing. The gate is slidably supported between the complementary portions of the housing, and is provided with a stem in threaded engagement with the handwheel. Any suitable sealing means, such as gaskets and packing material, may be employed to render the gate assembly substantially sealed to the atmosphere. The handwheel enables the gate to be shifted from one extreme position in which it blocks the pipe to the flow of material therethrough, to its other extreme position wherein the pipe is open.

The output of the mill is discharged through an opening in the bottom of the housing 15, into the common discharge conveyor 11. At the point of connection of the housing with the discharge conveyor, there is located a gate assembly 145, similar in construction to that previously described. This gate enables the discharge end of the housing to be closed off, when desired.

A similar gate 146 is located in the discharge line to the receptacle 13, this gate permitting the entire gang of mills to be isolated from said receptacle, when desired.

On the roof of the housing, I provide a pair of upstanding fittings or nipples 147. These are preferably located directly above the clamping bolts which join the two halves of the split clamping ring 31 that holds the die 27 to the back plate 29, and thus permit of the insertion of a suitable wrench for the tightening of such bolts in the assembling of the extrusion chamber. When not employed for this purpose, the upper or exposed end of each nipple is sealed off by a suitable threaded plug 149.

These nipples are further provided with a fitting 151 extending from the side of each, to receive a pipe 153 in which may be located a suitable shut-off valve 155. Such pipes may be utilized either in the evacuation of air from within the apparatus, or for the introduction of some inert gas or any other material into the apparatus, in accordance with the process to be carried out in the use of the apparatus described.

The entire assembly including the plurality of mills and associated supply and discharge components, is adapted to produce pellets of the ordinary variety, that is, of material which requires no precautionary measures in the preparation and pelleting thereof. Certain advantages over prior art apparatus, are to be realized, however, through the use of the gang assembly described, even though employed to produce the ordinary variety of pellets. The presence of the gates constitutes a desirable feature, in that their presence permits one to take any one or more of the mills out of service for cleaning or repair purposes, and without disturbing the operation of the remaining mills in the gang. Where the process requires a powdering or dusting of the pellets, as, for example, where the pellets include as an ingredient thereof a tacky material such as molasses, the dusting material can be blown into the housing through the pipe connections leading to the nipples.

If the mills are to be employed in the manufacture of pellets which include a tacky ingredient such as molasses, the construction of the die chamber and roller assembly should preferably be along the lines of that illustrated in Figures 4, 5 and 6 to avoid such difficulties as are apt to be encountered due to solidification of a film of such ingredient between the chamber and the roller.

Accordingly, one of the differences involves the recessing of the rear wall 29 of the die chamber to form a recess 157 of considerably larger diameter than the roller 47, so that only the lower edge of the roller lies adjacent the rear wall while a substantial space is created between the wall and the rest of the roller. Thus, there is considerably less chance for the tacky material to solidify between the roller and the aforementioned rear wall. Such material remains fluid and works itself out of such space into the chamber proper in response to the rotational movement of the die and roller. This takes care of the spacing on that side of the roller facing the rear wall of the die chamber.

To avoid corresponding difficulties at the other side of the roller where the roller is disposed adjacent the inner surface of the door, the side surface facing the door is grooved to provide a series of spaced grooves 159 having angularly related side walls 161 and 163, respectively. The grooves open out toward the periphery of the roller and in a direction away from the direction of rotation of the roller indicated by the arrow 165. This grooving of the roller has a tendency to centrifugally dispel such material as may seek to flow in between the roller and the door, and thereby discourages the entrance of such material.

Such rejection of material is enhanced by the provision of a steel washer 167 of a diameter comparable to that of the roller and set into a recess 169 in the inner surface of the door, with the center of the washer on the axis of the shaft 49. This enables maintenance of the adjustment of the eccentrically disposed roller without disturbing the washer. The washer is somewhat flattened at the bottom to avoid interference with the die. The side of the washer facing the roller is provided with grooves 171 of larger dimensions than those in the roller, such grooves being otherwise similar, except in that they are disposed in the reverse direction.

The interior edge 173 of the washer is beveled so as to form a drain pocket 175 adjacent the door when in its assembled position in the machine. Thus, any tacky material which might ultimately escape past the sealing means, will drain away from the washer and into the pocket and thus preclude an accumulation of such material within the washer grooves, where it might solidify and seal the roller against rotation. I prefer to drain such material from the pocket, while still in its fluid condition, and to this end, I provide a downwardly sloping drain hole 177 through the door adjacent the lower portion of the washer.

My invention, however, goes even further than this, for it contemplates the preparation and pelleting of certain materials which, because of their inherently dangerous character, could not be pelleted in the ordinary type of mill with safety and convenience. Such material must be prepared and pelleted out of contact with oxygen or the atmosphere, and this necessarily calls for the performance of the necessary operations in a neutral environment, and by neutral environment, I mean to include a vacuum or an inert gas.

If the machine of Figure 4 is to be employed in pelleting material which requires that the operation be performed in a neutral environment, then the drain hole 177 may preferably be plugged with any suitable closure.

The pipe connections provide the means whereby a neutral environment can be realized, and by reason of the fact that the entire apparatus has been so constructed as to render it sealed to the atmosphere, the vacuum or inert gas environment will not be restricted to the housing, but will extend throughout the entire apparatus, from the supply source to the receptacle for receiving the finished product.

Thus, it will be apparent that the apparatus described by me will fulfill the objects of my invention, and while I have disclosed the same in a preferred embodiment, the invention is susceptible to change and modification, without departing from the spirit thereof. I, accordingly, do not desire to be limited in my protection to the specific details of my disclosure, except as may be necessitated by the appended claims.

I claim:

1. Apparatus for the pelleting of material, comprising a plurality of pellet mills; means for supplying material to said mills; means common to all of said mills for simultaneously withdrawing the pellet output of each of them, said mills and said common withdrawal means being sealed to the atmosphere; and means for isolating any of said mills from said common withdrawal means, to enable cleaning and repairing of such mills without disturbing the operation of the others.

2. Apparatus for the pelleting of material, comprising a plurality of pellet mills; means common to all of said mills for supplying material thereto; means common to all of said mills for simultaneously withdrawing the pellet output of each of them, said common supplying means, said mills and said common withdrawal means being sealed to the atmosphere; and means for isolating any of said mills from said common supplying means and said common withdrawal means, to enable cleaning and repairing of such mills without disturbing the operation of the others.

3. Apparatus for the pelleting of material, comprising a plurality of pellet mills; means for supplying material to said mills; means common to all of said mills for simultaneously withdrawing the pellet output of each of them; said supplying means, said mills and said common withdrawal means being sealed to the atmosphere; means communicating with the interior of each of said mills for the introduction of a treating medium into each of said mills; and means for isolating any of said mills from said supplying means and said common withdrawal means, to enable cleaning and repairing of such mills without disturbing the operation of the others.

4. Apparatus for the pelleting of material, comprising a plurality of pellet mills; means common to all of said mills for supplying material thereto; means common to all of said mills for simultaneously withdrawing the pellet output of each of them, said common supplying means, said mills and said common withdrawal means being sealed to the atmosphere; means communicating with the interior of each of said mills for the introduction of a treating medium into each of said mills; and means for isolating any of said mills from said common supplying means and said common withdrawal means, to enable cleaning and repairing of such mills without disturbing the operation of the others.

5. Apparatus for the pelleting of material normally susceptible to spontaneous combustion or otherwise readily combinable with oxygen, comprising a housing, extruding means supported in said housing, means connected with said housing for supplying material to be pelleted to said extruding means, means also connected with said housing for removing therefrom the output of said extruding means, said supplying means, housing and removing means being sealed to each other and closed to the atmosphere to provide a space within having no access to the atmosphere, and means providing for the creation of a neutral environment in such space in accordance with any desired procedure.

6. Apparatus for the pelleting of material normally susceptible to spontaneous combustion or otherwise readily combinable with oxygen, comprising a housing, extruding means supported in said housing, means connected with said housing for supplying material to be pelleted to said extruding means, means also connected with said housing for removing therefrom the output of said extruding means, said supplying means, housing and removing means being sealed to each other and closed to the atmosphere to provide a space within having no access to the atmosphere, and means operable to isolate said extruding means from said supplying means and said removing means.

7. Apparatus for the pelleting of material normally susceptible to spontaneous combustion or otherwise readily combinable with oxygen, comprising a housing, extruding means supported in said housing, means connected with said housing for supplying material to be pelleted to said extruding means, means also connected with said housing for removing therefrom the output of said extruding means, said supplying means, housing and removing means being sealed to each other and closed to the atmosphere to provide a space within having no access to the atmosphere, means providing for the creation of a neutral environment in such space in accordance with any desired procedure, and means operable to isolate said extruding means from said supplying means and said removing means.

8. Apparatus for the pelleting of material normally susceptible to spontaneous combustion or otherwise readily combinable with oxygen, comprising a housing having a door hingedly mounted thereon and adapted in its closed position to be sealed to said housing; an extrusion chamber in said housing including a cylindrical die; means sealed in a wall of said housing and supporting said die; an extrusion roller in said extrusion chamber; means sealed in another wall of said extrusion chamber and supporting said roller in cooperative relationship with said die; said cylindrical die and said extrusion roller being rotatable relative to each other; a hopper sealable to the atmosphere and having a feeder associated with the discharge end thereof, said hopper being mounted on said housing with said feeder extending into said housing in sealing engagement therewith; a conveyor disposed below said die and extending out of said housing in an air-tight passage leading therefrom; and a discharge receptacle in sealed connection to the discharge end of said conveyor.

9. Apparatus for the pelleting of material normally susceptible to spontaneous combustion or otherwise readily combinable with oxygen, comprising a housing having a door hingedly mounted thereon and adapted in its closed position to be sealed to said housing; an extrusion chamber in said housing including a cylindrical die; means sealed in a wall of said housing and supporting said die; an extrusion roller in said extrusion chamber; means sealed in another wall of said extrusion chamber and supporting said roller in cooperative relationship with said die; said cylindrical die and said extrusion roller being rotatable relative to each other; a hopper sealable to the atmosphere and having a feeder associated with the discharge end thereof, said hopper being mounted on said housing door with said feeder extending through said door in sealing engagement therewith; a conveyor disposed below said die and extending out of said housing in an air-tight passage leading therefrom; a discharge receptacle in sealed connection to the discharge end of said conveyor; and means for introducing an inert gas into the interior of said apparatus.

10. Apparatus for the pelleting of material normally susceptible to spontaneous combustion or otherwise readily combinable with oxygen, comprising a housing having a door hingedly mounted thereon and adapted in its closed position to be sealed to said housing; an extrusion chamber in said housing including a cylindrical die; means sealed in a wall of said housing and supporting said die; an extrusion roller in said extrusion chamber; means sealed in another wall of said extrusion chamber and supporting said roller in cooperative relationship with said die;

said cylindrical die and said extrusion roller being rotatable relative to each other; a hopper sealable to the atmosphere and having a screw type feeder associated with the discharge end thereof, said hopper being mounted on said housing door with said feeder extending through said door in sealing engagement therewith; a screw type conveyor disposed below said die and extending out of said housing in an air-tight passage leading therefrom; a discharge receptacle in sealed connection to the discharge end of said conveyor; a plurality of manually controllable cut-off gates sealed to the atmosphere, one disposed between said die and said last mentioned conveyor, and another disposed between said last mentioned conveyor and said discharge receptacle, and means providing for the introduction of a gas into the interior of said apparatus.

11. Apparatus for the pelleting of material normally susceptible to spontaneous combustion or otherwise readily combinable with oxygen, comprising a housing having a door hingedly mounted thereon and adapted in its closed position to be sealed to said housing; an extrusion chamber in said housing including a cylindrical die; means sealed in a wall of said housing and supporting said die; an extrusion roller in said extrusion chamber; means sealed in the door of said extrusion chamber and supporting said roller in cooperative relationship with said die; said cylindrical die and said extrusion roller being rotatable relative to each other; a supply chamber for receiving material in condition for pelleting; a hopper having a screw type feeder associated with the discharge end thereof, said hopper being mounted on said housing door with said feeder extending through said door in sealing engagement therewith; said supply chamber being connected to said hopper by a horizontal air-tight connecting passage, said passage including therein a screw type feeder; a screw type conveyor disposed below said die and extending out of said housing in an air-tight passage leading therefrom; a discharge receptacle in sealed connection to the discharge end of said last mentioned conveyor; a plurality of manually controllable cut-off gates sealed to the atmosphere, one disposed between said supply chamber feeder and said hopper to seal off the flow of material to said hopper, another disposed between said die and said last mentioned conveyor, and another disposed between said last mentioned conveyor and said discharge receptacle; and means permitting introduction of a gas into the interior of said apparatus.

12. Apparatus for the pelleting of material including an ingredient of a tacky nature, comprising an extrusion chamber having front and rear end walls and including a cylindrical die as a part thereof intermediate said end walls, an extrusion roller in said chamber, said roller being supported on a shaft entering said chamber through the front end wall thereof and having its sides closely adjacent both end walls of said chamber, said rear end wall having a recess therein facing said roller, said recess being of greater diameter than said roller and extending downwardly toward but not beyond the lower portion of said roller, said roller having a plurality of angularly disposed outwardly flaring grooves in that side facing the front end wall of said chamber, and a washer surrounding said shaft and supported on said front end wall, said washer having a plurality of similar grooves facing said roller but reversed in direction with respect to the grooves in said roller.

13. Apparatus for the pelleting of material including an ingredient of a tacky nature, comprising an extrusion chamber having front and rear end walls and including a cylindrical die as a part thereof intermediate said end walls, an extrusion roller in said chamber, supported on a shaft entering said chamber through the front end wall thereof and having its sides closely adjacent both end walls of said chamber, said roller having a plurality of angularly disposed outwardly flaring grooves in that side facing the front end wall of said chamber, and a washer surrounding said shaft and supported on said front end wall, said washer having a plurality of similar grooves facing said roller but reversed in direction with respect to the grooves in said roller.

14. Apparatus for the pelleting of material including an ingredient of a tacky nature, comprising an extrusion chamber having front and rear end walls and including a cylindrical die as a part thereof intermediate said end walls, and an extrusion roller in said chamber, said roller being supported on a shaft entering said chamber through the front end wall thereof and having its sides closely adjacent both end walls of said chamber, said rear end wall having a recess therein facing said roller, said recess being of greater diameter than said roller and extending downwardly toward but not beyond the lower portion of said roller, to preclude adhesion of said roller to said rear end wall through solidification of said tacky material.

EDGAR T. MEAKIN.